March 18, 1930.                A. VOLLM                 1,750,913
                              GLASS CUTTER
                           Filed Feb. 18, 1929
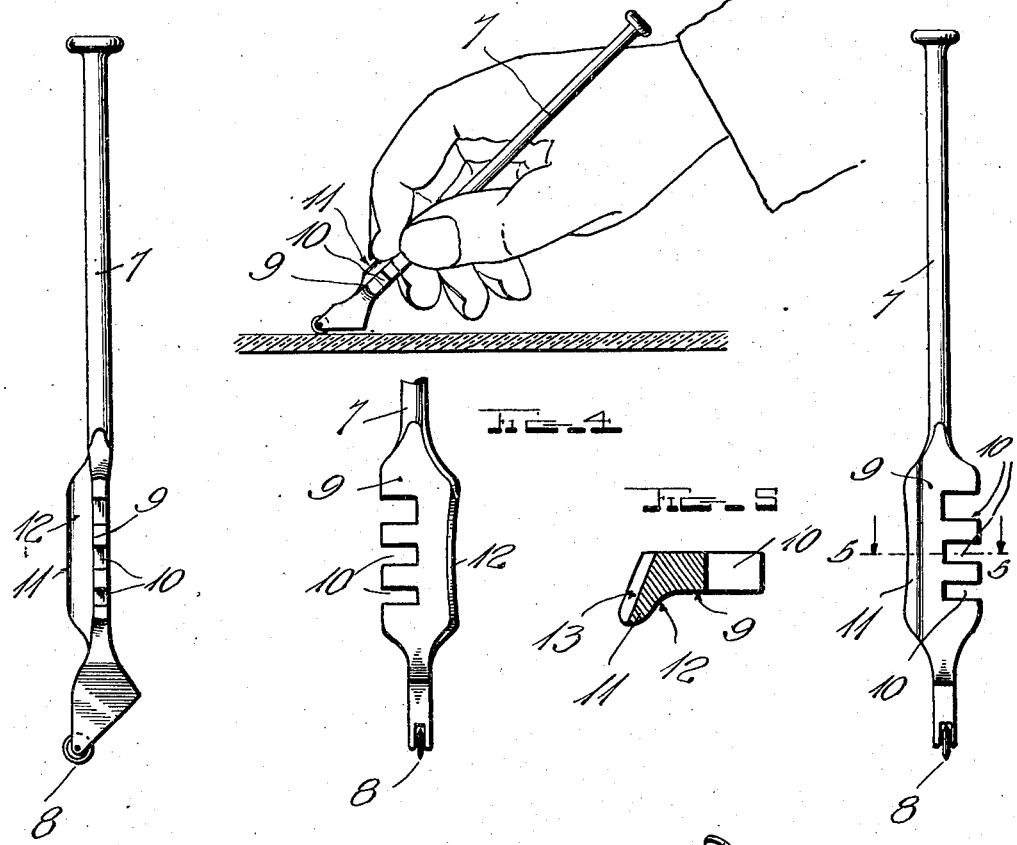
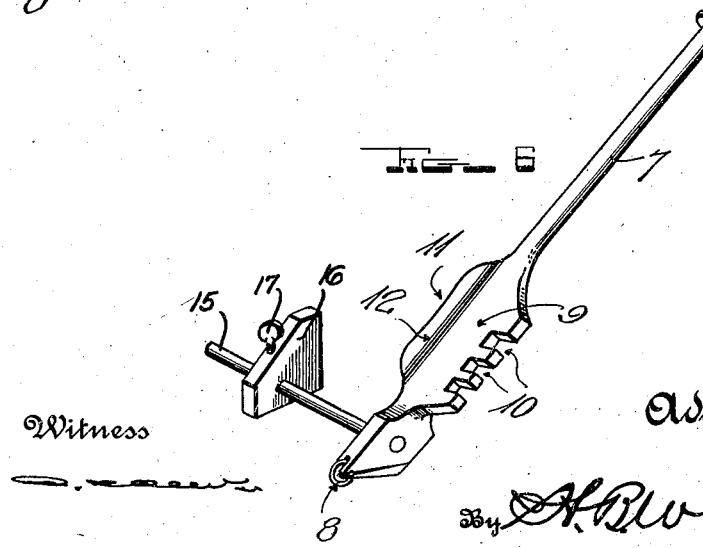

Patented Mar. 18, 1930

1,750,913

UNITED STATES PATENT OFFICE

ADOLF VOLLM, OF SOMERVILLE, MASSACHUSETTS

GLASS CUTTER

Application filed February 18, 1929. Serial No. 341,007.

This application is a continuation in part of my U. S. patent applications Serial Nos. 235,722, and 235,723 both filed November 25, 1927.

The invention relates to hand-operated glass cutters of the type comprising a shank of rigid construction throughout its length having glass-scoring means at its lower end and a notch near said end to receive an edge of the glass for breaking the latter along a line scored by said scoring means, the notch and scoring means being in fixed invariable relation. Heretofore, any glass cutter of the type defined, has had the glass-receiving notch facing in a direction parallel with the line on which the glass cutter is moved while performing the scoring operation, said notch usually opening rearwardly. Thus, in order that the notch may be engaged with the edge of the glass after scoring the latter, it is necessary that the shank be turned a quarter of a revolution by hand. While this consumes only a small amount of time, such time becomes an appreciable factor when cutting large quantities of glass, and it is the primary object of my invention to provide a new and improved glass cutter by which this time may be saved, my principal improvement consisting in so disposing the glass-receiving notch that its outer end faces in a direction transverse to the line on which the cutter is moved while scoring the glass. Thus, after performing the scoring operation, the notch may be engaged with the edge of the glass for breaking the latter along the scored line, without the necessity of turning or rotating the shank in the hand.

The specific form of the invention herein disclosed, also has reference to a glass cutter of the above defined form, whose shank is provided near its lower end with a flattened finger grip portion disposed in a plane transverse to the line on which the cutter is moved when scoring the glass. It is a further object of my invention to form the glass-receiving notch in an edge of this finger grip portion, so that it not only possesses the advantage above pointed out, but will be so engaged by the user's thumb and forefinger as to effectively prevent slipping of the latter upon the aforesaid finger grip portion.

A further object of the invention is to provide a glass cutter of such form that it may be conveniently and comfortably held in the hand and when so held has no tendency to turn about its longitudinal axis.

With the foregoing in view, the invention resides in the novel subject matter hereinafter described and claimed, the description being supplemented by the accompanying drawing.

Fig. 1 is a side elevation of a glass cutter constructed in accordance with the invention, showing the same in use.

Fig. 2 is an outer edge view.

Fig. 3 is a front elevation.

Fig. 4 is a fragmentary rear elevation.

Fig. 5 is a horizontal sectional view on line 5—5 of Fig. 3.

Fig. 6 is a perspective view showing a slightly different form of cutter provided with a gauge.

In the drawing above briefly described, the numeral 7 denotes the shank of the cutter, said shank being preferably somewhat longer than usual to permit greater pressure on the glass by means of the cutter. The lower end of shank 7 is provided with glass-scoring means of any desired form, such as the well known wheel 8. Near this lower end, the shank is provided with a flattened finger grip portion 9 disposed in a plane transverse to the line on which the cutter is moved when performing a glass scoring operation. In one edge of this finger grip portion 9, I form a glass-engaging notch or notches 10, three of these notches being herein shown. By forming the notches 10 in the finger grip portion 9, they so engage the user's thumb and forefinger as to prevent slippage upon said portion. Moreover, as the notches 10 open laterally of the shank, that is, have their open outer ends facing in a direction transverse to the line of movement of the cutter, there is no loss of time between a glass-scoring operation and a glass-breaking operation with the aid of one of said notches 10, occasioned by turning of the shank as with the usual cutter. Assuming that the cutter is being pulled toward the user, near the right hand end of a pane of glass to score the same, it is a quick and easy matter upon completion of the scoring operation, to merely shift the cutter laterally, downwardly and then inwardly to dispose the edge of the pane in one or the other of the notches 10, permitting use thereof to break the pane along the scored line. In glass cutters in which the notches 10 open rearwardly or even forwardly, it is necessary to turn the entire cutter one-fourth of a revolution after scoring the glass, before an edge of the latter can be positioned in one of said notches, and this is not only troublesome, but when cutting large quantities of glass, adds materially to the length of time required and to the fatigue of the workman.

In the preferred form of construction, the longitudinal edge of the flattened finger grip portion 9, is longitudinally concave to a slight extent and is provided throughout its length with a thin forwardly extending flange 11 whose inner side 12 is transversely concave and obtuse to the front face of said portion 9. The outer side 13 of the flange 11 and the joining edge of the portion 9, are obtuse to the rear side of said portion 9, and obviously the flange is longitudinally curved in accordance with the curvature of said edge. This flange 11 adds materially to the user's comfort when holding the cutter for long periods of time and it also overcomes any tendency of the cutter to turn about its longitudinal axis. The user's forefinger lies against the front side of the portion 9, his thumb engages the notched edge of said portion, the inner side of his forefinger rests comfortably against the curved inner side 12 of the flange 11, and the second finger lies against the longitudinally curved outer side of said flange. The necessary gripping pressure for holding the cutter is obtained by this second finger and the thumb, and the pulling force necessary in operating the cutter, is obtained by the forefinger. The thumb, forefinger and second finger jointly hold the cutter down with the necessary pressure upon the work.

In Fig. 6, the shank or handle portion 7 is provided near its lower end with a rigidly attached rod 15 which projects laterally in the opposite direction from that toward which the notches 10 open. A gauge shoe 16 is adjustably mounted on this rod 15, being held in one position or another by a set screw 17. This gauge equipment is advantageous in cutting strips of glass of relatively long and narrow form. The gauge shoe 16 follows along the outer edge of the glass while the cutter is scoring the latter and due to the relation of said shoe and the notches 10, after scoring, it is simply necessary to laterally shift and lower the cutter, without turning it about its longitudinal axis in order to engage any of the notches with the edge of the glass. This subject matter was originally disclosed in U. S. patent application Ser. No. 235,723, above mentioned.

The details disclosed are proving to be highly efficient and desirable from all standpoints and they are preferably followed. However, within the scope of the invention as claimed, variations may be made.

I claim:—

1. An improvement in a glass cutter of the type comprising a shank of rigid construction throughout its length adapted to be held in substantially vertical position between the user's thumb and second finger having glass scoring means at its lower end, a flattened fore-finger-engaging portion near said lower end disposed in a plane transverse to the line on which the cutter is moved when scoring the glass, and a notch to receive an edge of the glass for breaking the latter along a line scored by said scoring means, the notch and scoring means being in fixed invariable relation; said improvement consisting in forming said notch in an edge of said fore-finger-engaging portion, whereby it assists in obtaining an anti-slipping grip thereon and opens laterally for engagement with the glass after the scoring operation by simply shifting the shank laterally and downwardly without the necessity of turning said shank with the fingers.

2. A glass cutter comprising a shank of rigid construction throughout its length adapted to be held in substantially vertical position between the user's thumb and second finger having glass-scoring means at its lower end and being provided near said lower end with a flattened fore-finger-engaging portion disposed in a plane transverse to the line on which the cutter is moved when scoring the glass, one longitudinal edge of said fore-finger-engaging portion being formed with a glass breaking notch, the other longitudinal edge of said fore-finger-engaging portion being longitudinally concave and obtuse to the rear side of said portion, and a flange projecting forwardly from said longitudinally concave edge, said flange having the same longitudinal curvature as said concave edge, the inner side of said flange being transversely concave and obtuse to the front side of said finger grip portion, the outer side of said flange being obtuse to the rear side of said finger grip portion.

3. A tool of the class described comprising a glass cutter having a shank or handle portion, and a gauge connected with said cutter and embodying a shoe spaced laterally in one direction from said cutter, said shank having a glass-breaking notch whose open outer end faces laterally away from said shoe.

In testimony whereof I have hereunto affixed my signature.

ADOLF VOLLM.